United States Patent
Brown et al.

(12)

(10) Patent No.: US 6,333,688 B1
(45) Date of Patent: Dec. 25, 2001

(54) TAIL LIGHT ENHANCEMENT SYSTEM

(76) Inventors: Tyrone A. Brown; Yvonne A. Brown, both of 27699 E. 21$^{st}$ St., Highland, CA (US) 92346

( * ) Notice: Subject to any disclaimer, the term of this patent is extended or adjusted under 35 U.S.C. 154(b) by 0 days.

(21) Appl. No.: 09/528,224

(22) Filed: Mar. 17, 2000

(51) Int. Cl.$^7$ ..................................... B60Q 1/44
(52) U.S. Cl. .................. 340/479; 340/472; 340/478
(58) Field of Search .................... 340/479, 480, 340/472; 359/727, 729

(56) References Cited

U.S. PATENT DOCUMENTS

| | | |
|---|---|---|
| 3,846,749 | 11/1974 | Curry . |
| 4,726,627 | 2/1988 | Frait et al. . |
| 4,837,554 | 6/1989 | Gianforcaro . |
| 4,918,424 | 4/1990 | Sykora . |
| 4,951,179 * | 8/1990 | Machida ................. 362/61 |
| 5,089,805 | 2/1992 | Salsman . |
| 5,150,098 | 9/1992 | Rakow . |
| 5,448,456 * | 9/1995 | Huynh ..................... 362/80 |
| 5,610,578 * | 3/1997 | Gilmore ................. 340/479 |
| 5,805,060 * | 9/1998 | Schroeder ............... 340/467 |
| 5,856,793 * | 1/1999 | Tonkin et al. ........... 340/903 |
| 5,927,848 * | 7/1999 | Natsume et al. ........ 362/496 |
| 5,933,084 * | 8/1999 | Ravier et al. ........ 340/815.73 |
| 6,054,919 * | 4/2000 | Demko ................... 340/479 |

* cited by examiner

*Primary Examiner*—Jeffery Hofsass
*Assistant Examiner*—Son Tang

(57) ABSTRACT

A new tail light enhancement system for providing a brake light which variably directs light towards another driver behind a vehicle depending upon the amount of brake pressure applied. The inventive device includes a plurality of vertical or horizontal convex lenses adjacent to one another, a corresponding plurality of lights, a central processing unit electrically connected to the plurality of lights, and a rheostat electrically connected to the central processing unit. The concentric portion of the convex lenses directs a substantial amount of light directly towards the other driver, while the outer portion of the vertical or horizontal convex lenses directed increasingly away from the other driver. The rheostat is mechanically attached to a brake pedal within the vehicle for determining the amount of brake pressure applied. The central processing unit electrically activates the concentric portion and the outer portion of the lights corresponding to the amount of brake pressure applied.

6 Claims, 2 Drawing Sheets

TAIL LIGHT ENHANCEMENT SYSTEM

BACKGROUND OF THE INVENTION

1. Field of the Invention

The present invention relates to brake light devices and more particularly pertains to a new tail light enhancement system for providing a brake light which variably directs light towards another driver behind a vehicle depending upon the amount of brake pressure applied.

2. Description of the Prior Art

The use of brake light devices is known in the prior art. More specifically, brake light devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,150,098; U.S. Pat. No. 5,089,805; U.S. Pat. No. 4,837,554; U.S. Pat. No. 4,918,424; U.S. Pat. No. 4,726,627 and U.S. Pat. No. 3,846,749.

While these devices fulfill their respective, particular objectives and requirements, the aforementioned patents do not disclose a new tail light enhancement system. The inventive device includes a plurality of vertical or horizontal convex lenses adjacent to one another, a corresponding plurality of lights, a central processing unit electrically connected to the plurality of lights, and a rheostat electrically connected to the central processing unit.

In these respects, the tail light enhancement system according to the present invention substantially departs from the conventional concepts and designs of the prior art, and in so doing provides an apparatus primarily developed for the purpose of providing a brake light which variably directs light towards another driver behind a vehicle depending upon the amount of brake pressure applied.

SUMMARY OF THE INVENTION

In view of the foregoing disadvantages inherent in the known types of brake light devices now present in the prior art, the present invention provides a new tail light enhancement system construction wherein the same can be utilized for providing a brake light which variably directs light towards another driver behind a vehicle depending upon the amount of brake pressure applied.

The general purpose of the present invention, which will be described subsequently in greater detail, is to provide a new tail light enhancement system apparatus and method which has many of the advantages of the brake light devices mentioned heretofore and many novel features that result in a new tail light enhancement system which is not anticipated, rendered obvious, suggested, or even implied by any of the prior art brake light devices, either alone or in any combination thereof.

To attain this, the present invention generally comprises a plurality of vertical or horizontal convex lenses adjacent to one another, a corresponding plurality of lights, a central processing unit electrically connected to the plurality of lights, and a rheostat electrically connected to the central processing unit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tail light enhancement system apparatus and method which has many of the advantages of the brake light devices mentioned heretofore and many novel features that result in a new tail light enhancement system which is not anticipated, rendered obvious, suggested, or even implied by any of the prior art brake light devices, either alone or in any combination thereof.

It is another object of the present invention to provide a new tail light enhancement system which may be easily and efficiently manufactured and marketed.

It is a further object of the present invention to provide a new tail light enhancement system which is of a durable and reliable construction.

An even further object of the present invention is to provide a new tail light enhancement system which is susceptible of a low cost of manufacture with regard to both materials and labor, and which accordingly is then susceptible of low prices of sale to the consuming public, thereby making such tail light enhancement system economically available to the buying public.

Still yet another object of the present invention is to provide a new tail light enhancement system which provides in the apparatuses and methods of the prior art some of the advantages thereof, while simultaneously overcoming some of the disadvantages normally associated therewith.

Still another object of the present invention is to provide a new tail light enhancement system for providing a brake light which variably directs light towards another driver behind a vehicle depending upon the amount of brake pressure applied.

Yet another object of the present invention is to provide a new tail light enhancement system which includes a plurality of vertical or horizontal convex lenses adjacent to one another, a corresponding plurality of lights, a central processing unit electrically connected to the plurality of lights, and a rheostat electrically connected to the central processing unit.

Still yet another object of the present invention is to provide a new tail light enhancement system that forewarns another driver of the amount of deceleration of the vehicle in order to prevent an accident from occurring.

Even still another object of the present invention is to provide a new tail light enhancement system that saves lives and prevents accidents.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
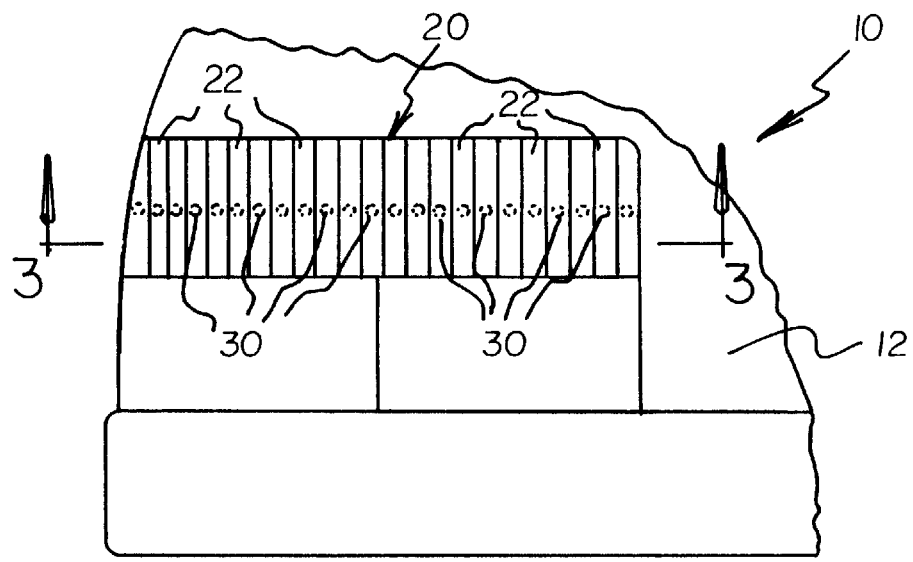
FIG. 1 is a rear view of a new tail light enhancement system secured within a rear end of a vehicle according to the present invention.

With reference now to the drawings, and in particular to FIGS. 1 through 4 thereof, a new tail light enhancement system embodying the principles and concepts of the present invention and generally designated by the reference numeral 10 will be described.

More specifically, it will be noted that the tail light enhancement system 10 comprises a light directing means 20, a plurality of light bulbs 30, a central processing unit 50, and a rheostat 40.

Figure 2:
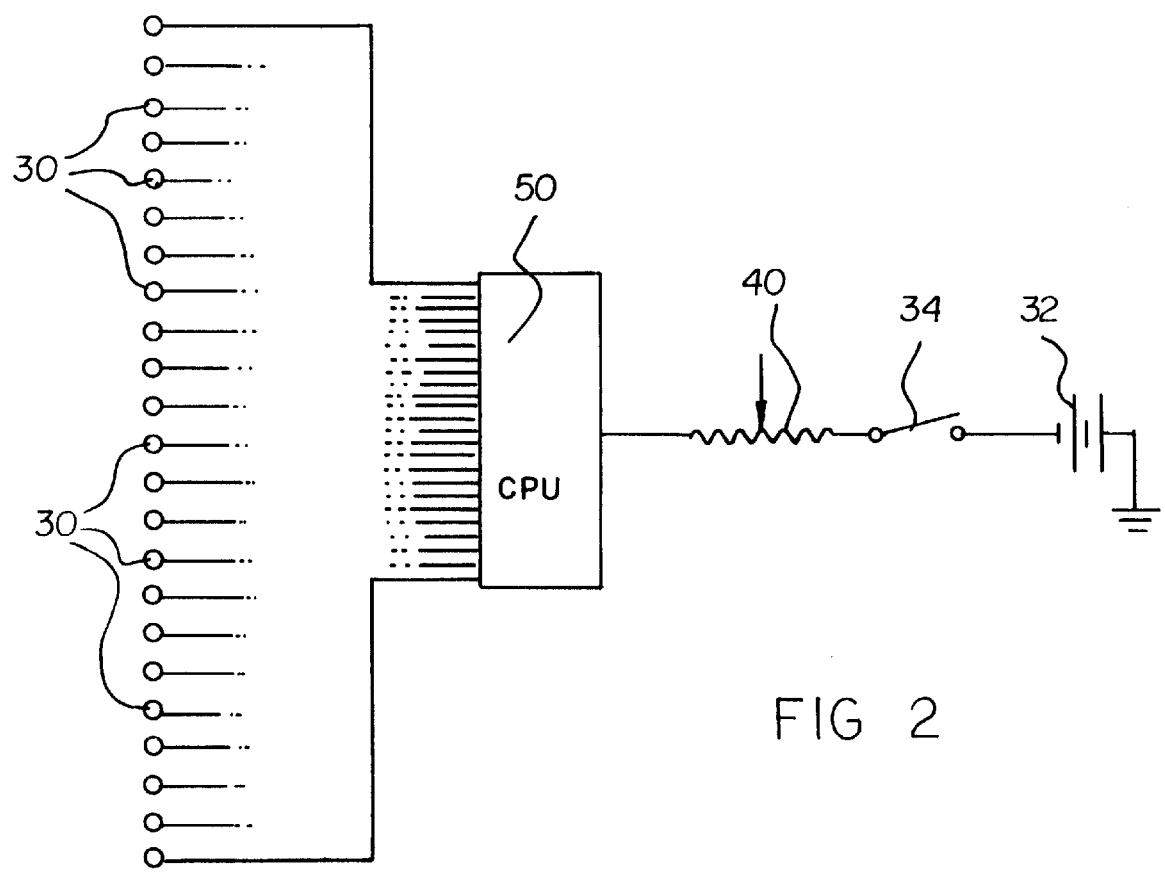
FIG. 2 is a schematic diagram of the present invention.

As best shown in FIG. 1, the plurality of light bulbs 30 are secured within an unnumbered encasement wherein the unnumbered encasement is attached to a rear end 12 of a vehicle. The light directing means 20 is secured within the encasement adjacent the plurality of light bulbs 30 for selectively directing a radiation of light from each individual light bulb for increasing an aggregate radiation of the light corresponding to an increase in pressure applied to a brake pedal (not shown) by a driver. The central processing unit 50 is electrically connected to the plurality of light bulbs 30, wherein the central processing unit 50 controls the plurality of light bulbs 30 as shown in FIG. 2 of the drawings. The rheostat 40 is mechanically connected to the unnumbered brake pedal. The rheostat 40 is electrically connected to the central processing unit 50 as shown in FIG. 2 of the drawings. The rheostat 40 is electrically connected to a brake switch 34 which is electrically connected to a power source 32 within the vehicle for allowing the central processing 50 to detect the amount of pressure applied to the unnumbered brake pedal by the driver.

Figure 3:
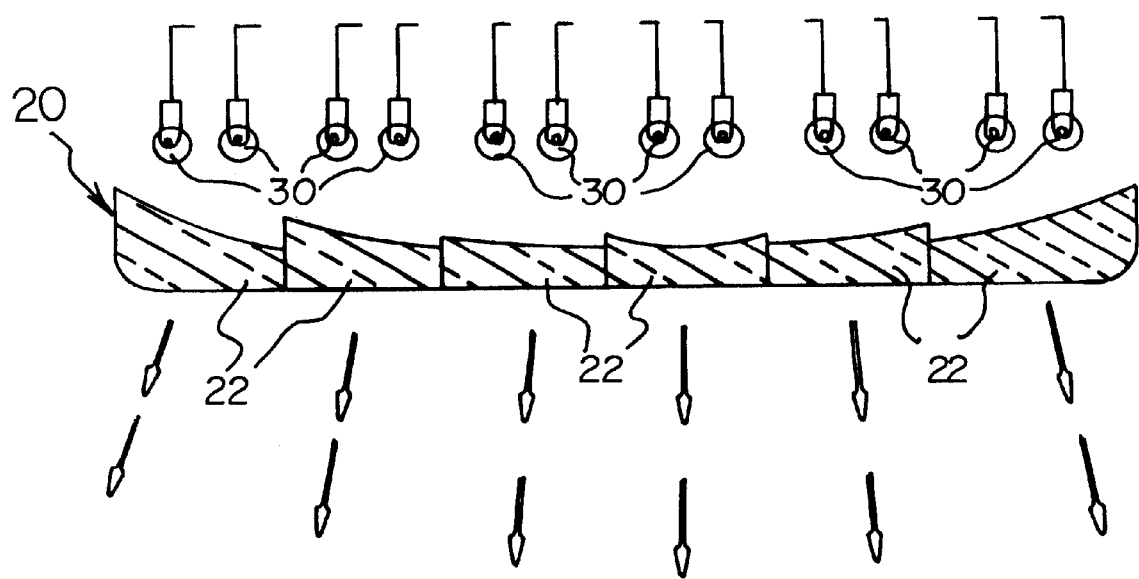
FIG. 3 is a cross sectional view taken along line 3—3 of FIG. 1 disclosing the plurality of vertical or horizontal convex lenses.

As shown in FIGS. 1 and 3 of the drawings, the light directing means 20 comprises a plurality of convex lenses 22 aligned parallel to one another having a concentric portion and a pair of outer portions. The convex lenses may be horizontally or vertically oriented. Each of the plurality of vertical or horizontal convex lenses 22 corresponds to a pair of the light bulbs 30 for directing the light radiating from the pair of the light bulbs 30 as best shown in FIG. 3 of the drawings. The outer portions preferably direct the light substantially away from another vehicle positioned behind the vehicle as further shown in FIG. 3 of the drawings. The concentric portion preferably directs the light substantially towards the other vehicle. The central processing 50 controls a combination of the plurality of light bulbs 30 for producing a corresponding aggregate radiation of the light which represents the amount of pressure applied to the brake pedal by the driver.

Figure 4:
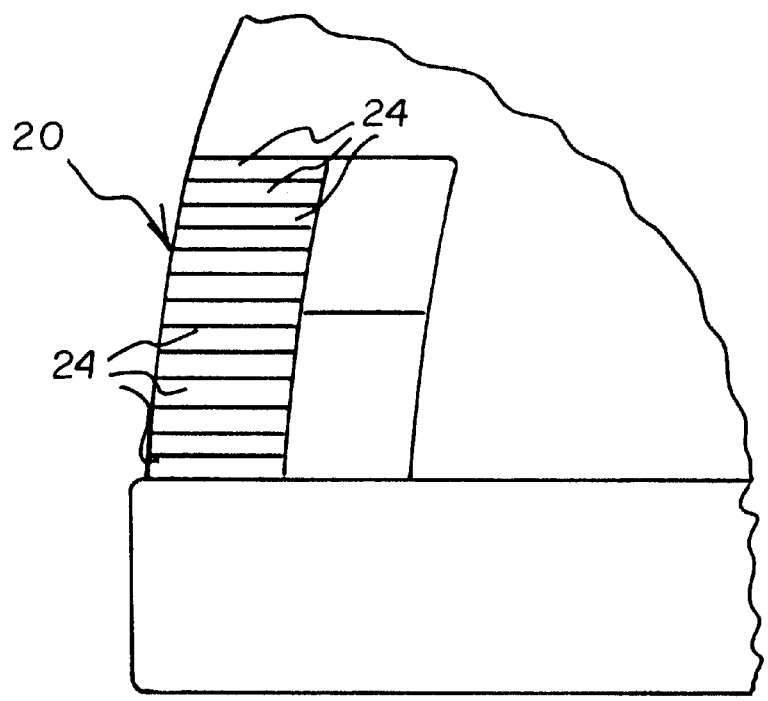
FIG. 4 is a rear view of an alternative embodiment disclosing a plurality of horizontal convex lenses.

In an alternative embodiment as shown in FIG. 4 of the drawings, the light directing means 20 comprises a plurality of horizontal convex lenses 24 aligned parallel to one another having a concentric portion and a pair of outer portions. Each of the plurality of horizontal convex lenses 24 corresponds to a pair of the light bulbs 30 for directing the light radiating from the pair of the light bulbs 30 as best shown in FIG. 3 of the drawings. The outer portions preferably direct the light substantially away from another vehicle positioned behind the vehicle as further shown in FIG. 3 of the drawings. The concentric portion preferably directs the light substantially towards the other vehicle. The central processing 50 controls a combination of the plurality of light bulbs 30 for producing a corresponding aggregate radiation of the light which represents the amount of pressure applied to the brake pedal by the driver.

In use, when the driver presses upon the unnumbered brake pedal, the rheostat 40 varies the amount of resistance in series with the power source 32 connected by the closing of the brake switch 34. The amount of resistance from the rheostat 40 is dependent upon the amount of pressure applied to the unnumbered brake pedal. The amount of resistance is detected by the central processing unit 50 which accordingly selectively activates the proper light bulbs 30 of the plurality of light bulbs 30 to produce an intensity of light commensurate with the amount of pressure applied to the unnumbered brake pedal. For instance, when the pressure applied is very slight, only a few of the light bulbs 30 corresponding to the outer portion of the vertical or horizontal convex lenses 22 will be activated, thereby producing a weak illumination of the present invention. However, when substantial amount of pressure is applied to the unnumbered brake pedal, all of the light bulbs 30 are activated, including those corresponding to the concentric portion of vertical or horizontal convex lenses 22, thereby producing a strong illumination of the present invention to warn another driver that you are making a quick stop.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A tail light enhancement system comprising:
   a plurality of light bulbs secured within an encasement wherein said encasement is attached to a rear end of a vehicle;
   a light directing means secured within said encasement adjacent said plurality of light bulbs for selectively directing a radiation of light from each individual said light bulb for increasing an aggregate radiation of said light corresponding to an increase in pressure applied to a brake pedal by a driver;
   a central processing unit electrically connected to said plurality of light bulbs, wherein said central processing unit controls said plurality of light bulbs;
   a rheostat mechanically connected to said brake pedal and electrically connected to said central processing unit, wherein said rheostat is electrically connected to a brake switch which is electrically connected to a power source within said vehicle for allowing said central processing unit to detect the amount of pressure applied to said brake pedal by said driver; and
   wherein said light directing means comprises a plurality of convex lenses aligned parallel to one another having a concentric portion and a pair of outer portions, at least one of said outer portions of each of said plurality of convex lenses abutting another of said plurality of convex lenses, said concentric portion of each of said plurality of convex lenses having an increasing degree of curvature opposite a central point of said light directing means, wherein said outer portions direct said light substantially away from another vehicle positioned behind said vehicle and said concentric portion directs said light substantially towards said other vehicle.

2. The tail light enhancement system of claim 1, wherein said plurality of convex lenses are aligned horizontally and vertically, each of said plurality of convex lenses corresponds to a pair of said light bulbs for directing said light radiating from said pair of said light bulbs, whereby said central processing unit controls a combination of said plurality of light bulbs for producing a corresponding said aggregate radiation of said light which represents the amount of pressure applied to said brake pedal by said driver.

3. The tail light enhancement system of claim 1, wherein said plurality of convex lenses are aligned horizontally, each of said plurality of convex lenses corresponds to a pair of said light bulbs for directing said light radiating from said pair of said light bulbs, whereby said central processing unit controls a combination of said plurality of light bulbs for producing a corresponding said aggregate radiation of said light which represents the amount of pressure applied to said brake pedal by said driver.

4. A tail light enhancement system comprising:
   a plurality of light bulbs secured within an encasement wherein said encasement is attached to a rear end of a vehicle;
   a light directing means secured within said encasement adjacent said plurality of light bulbs for selectively directing a radiation of light from each individual said light bulb for increasing an aggregate radiation of said light corresponding to an increase in pressure applied to a brake pedal by a driver;
   a central processing unit electrically connected to said plurality of light bulbs, wherein said central processing unit controls said plurality of light bulbs;
   a rheostat mechanically connected to said brake pedal and electrically connected to said central processing unit, wherein said rheostat is electrically connected to a brake switch which is electrically connected to a power source within said vehicle for allowing said central processing unit to detect the amount of pressure applied to said brake pedal by said driver;
   wherein said light directing means comprises a plurality of convex lenses aligned parallel to one another having a concentric portion and a pair of outer portions, at least one of said outer portions of each of said plurality of convex lenses abutting another of said plurality of convex lenses, said concentric portion of each of said plurality of convex lenses having an increasing degree of curvature opposite a central point of said light directing means, wherein said outer portions direct said light substantially away from another vehicle positioned behind said vehicle and said concentric portion directs said light substantially towards said other vehicle;
   wherein said plurality of convex lenses are aligned horizontally and vertically, each of said plurality of convex lenses corresponds to a pair of said light bulbs for directing said light radiating from said pair of said light bulbs, whereby said central processing unit controls a combination of said plurality of light bulbs for producing a corresponding said aggregate radiation of said light which represents the amount of pressure applied to said brake pedal by said driver;
   wherein said plurality of convex lenses are aligned horizontally, each of said plurality of convex lenses corresponds to a pair of said light bulbs for directing said light radiating from said pair of said light bulbs, whereby said central processing unit controls a combination of said plurality of light bulbs for producing a corresponding said aggregate radiation of said light which represents the amount of pressure applied to said brake pedal by said driver.

5. A tail light enhancement device for mounting on a vehicle, said system comprising:
   an encasement for mounting on a rear end of a vehicle, said encasement having an interior;
   a plurality of lights mounted in the interior of said encasement;
   a light directing means mounted on said encasement adjacent to said plurality of light bulbs for selectively directing light radiated from each individual said light bulb for increasing an aggregate amount of light radiated from said encasement to correspond to increasing pressure applied to a brake pedal of the vehicle by a driver;
   a central processing unit electrically connected to said plurality of light bulbs, wherein said central processing unit controls supply of electrical power to said plurality of light bulbs;
   a rheostat adapted for mechanically connecting to said brake pedal and electrically connected to said central processing unit, wherein said rheostat is electrically connectable to a brake switch of the vehicle for allowing said central processing unit to detect an amount of pressure applied to said brake pedal by said driver;

wherein said central processing unit is adapted to control the amount of electrical power supplied to said plurality of lights such that the amount of electrical power supplied corresponds to the amount of pressure applied to the brake pedal;

wherein said light directing means comprises a lens with a plurality of generally convex lens surfaces aligned substantially parallel to each other, each of said convex lens surfaces having a pair of outer regions and a central region between said outer portions; said convex lens surfaces being arranged in a linear array such that at least one of said outer regions of each of said plurality of convex lens surfaces is positioned adjacent to the outer region of another one of said convex lens surfaces, each of said plurality of convex lens surfaces having a degree of curvature, said degree of curvature of more centrally located convex lens surfaces in said linear array being relatively smaller than said degree of curvature of less centrally located convex lens surfaces in said linear array, wherein said outer regions direct light substantially away from a vehicle positioned behind the vehicle and said central region directs light substantially towards the vehicle positioned behind.

6. The tail light enhancement system of claim 1, wherein a pair of said plurality of lights are positioned adjacent to each of said plurality of convex lens surfaces, wherein said central processing unit controls the amount of electrical each pair of lights a combination of said plurality of light bulbs for controlling supply of electrical power to each pair of lights.

* * * * *